United States Patent
Shuy

(10) Patent No.: US 10,516,271 B2
(45) Date of Patent: Dec. 24, 2019

(54) SINGLE-PHASE ENERGY UTILIZATION TRACKING INVERTER

(71) Applicant: LT LIGHTING (TAIWAN) CORP., Xiangshan Dist., Hsinchu (TW)

(72) Inventor: Geoffrey Wen-Tai Shuy, Taipei (TW)

(73) Assignee: LT LIGHTING (TAIWAN) CORP., Hsinchu, Taiwan (CN)

( * ) Notice: Subject to any disclaimer, the term of this patent is extended or adjusted under 35 U.S.C. 154(b) by 0 days.

(21) Appl. No.: 16/024,480

(22) Filed: Jun. 29, 2018

(65) Prior Publication Data

US 2018/0375335 A1    Dec. 27, 2018

(51) Int. Cl.
| | |
|---|---|
| *H02J 5/00* | (2016.01) |
| *H02J 3/38* | (2006.01) |
| *H02M 7/48* | (2007.01) |
| *H02S 40/32* | (2014.01) |

(52) U.S. Cl.
CPC ............ *H02J 3/383* (2013.01); *H02J 5/00* (2013.01); *H02M 7/4807* (2013.01); *H02S 40/32* (2014.12)

(58) Field of Classification Search
CPC .... H02J 3/383; H02J 5/00; H02J 3/38; H02M 7/4807; H02M 7/49; H02M 7/497; H02M 7/48; H02S 40/32
See application file for complete search history.

(56) References Cited

U.S. PATENT DOCUMENTS

| | | | | |
|---|---|---|---|---|
| 6,058,032 | A * | 5/2000 | Yamanaka | H02J 7/0013 363/71 |
| 8,471,409 | B2 | 6/2013 | Chang et al. | |
| 2006/0181906 | A1 | 8/2006 | Batarseh et al. | |
| 2012/0275196 | A1 | 11/2012 | Chapman et al. | |
| 2013/0314948 | A1* | 11/2013 | Perreault | H02M 7/497 363/8 |
| 2015/0043254 | A1* | 2/2015 | Preckwinkel | H02M 7/49 363/41 |
| 2016/0276837 | A1* | 9/2016 | Manjrekar | H02J 3/383 |
| 2017/0317643 | A1* | 11/2017 | Lee | H02M 1/32 |
| 2017/0338651 | A1* | 11/2017 | Fishman | H02J 3/01 |

OTHER PUBLICATIONS

PCT/US19/30253, Notification of Transmittal of the International Search Report and the Written Opinion of the International Searching Authority, or Declaration dated Jul. 17, 2019. (12 pages).

* cited by examiner

*Primary Examiner* — Jared Fureman
*Assistant Examiner* — Emmanuel Dominique
(74) *Attorney, Agent, or Firm* — Workman Nydegger

(57) ABSTRACT

A single-phase Energy Utilization Tracker (EUT) inverter that comprises two DC/AC conversion modules. At any time, the two modules combined can sequentially extract and convert most the power provided by a DC energy source into two AC power (voltage) trains. The first AC power (voltage) train conforms to the power grid convention; while the second AC power train has a 90 degree phase difference to the specific power line pair. In according to the principle described herein, this single-phase EUT inverter further comprising a phase adjuster to adjust the phase of the second AC power (voltage) train by 90 degrees to become synchronous with the first AC power train; both AC power trains being then suitable to deliver into the same power line.

17 Claims, 9 Drawing Sheets

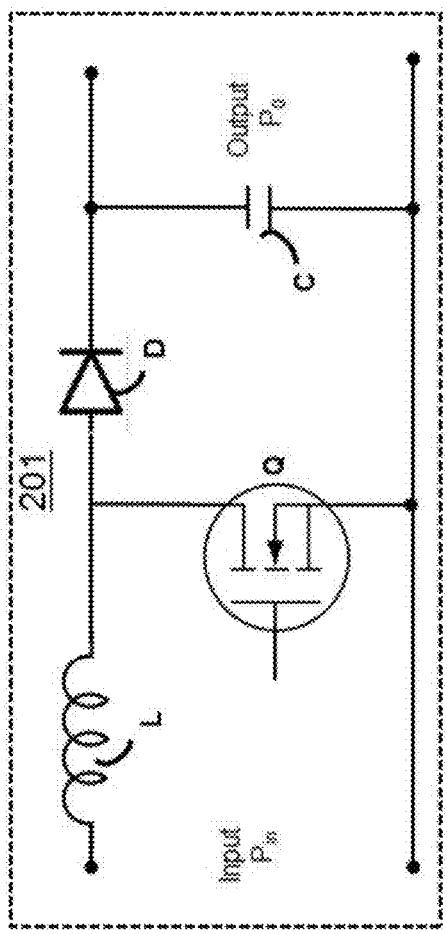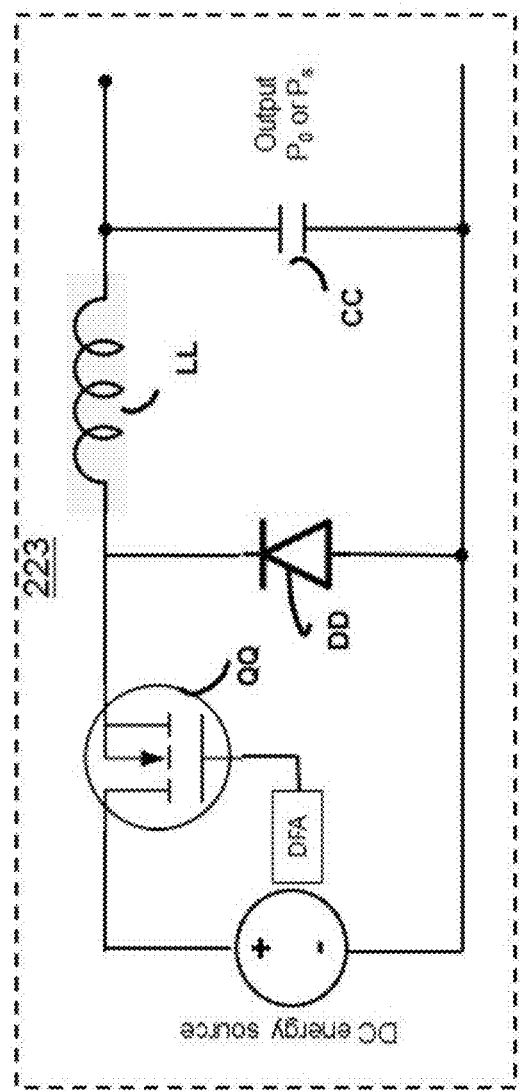

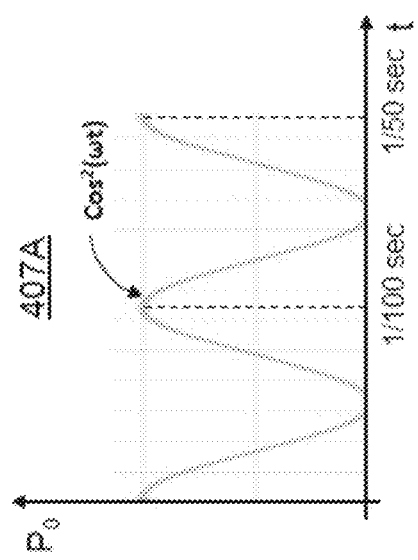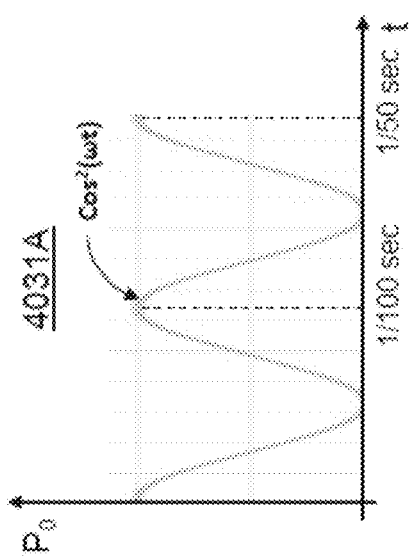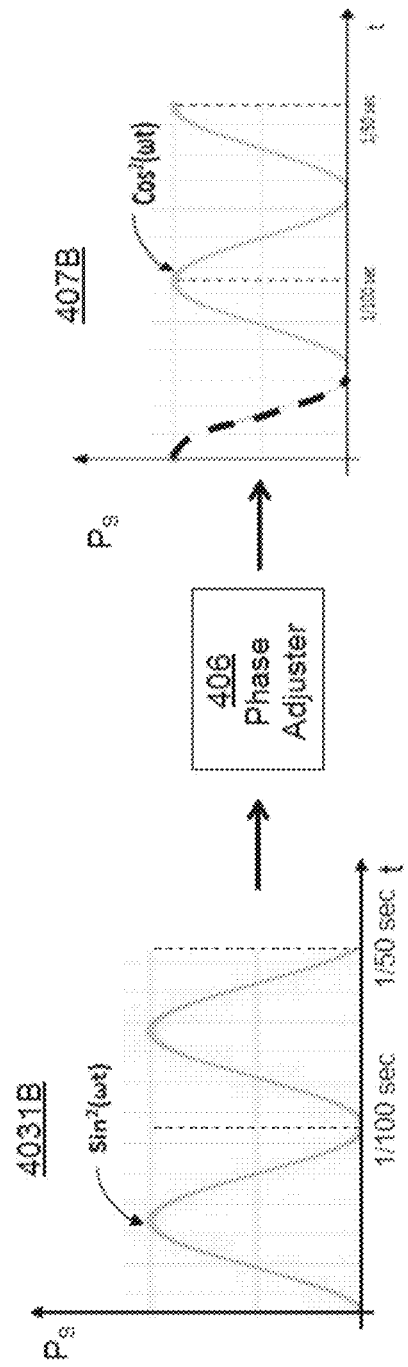

SINGLE-PHASE ENERGY UTILIZATION TRACKING INVERTER

BACKGROUND

An AC power grid system (also referred to as an "AC power grid", "power grid", or simply "grid") is a power system having at least one pair of power lines for delivering electricity produced in one or more potentially distributed power plants to distributed consumers that have loads connected in parallel to the power lines. Such loads will collectively be referred to as "the load" or "the grid load" herein.

It is mandatory that any electricity delivered into the power lines of the grid conform to the "power grid convention". According to the power grid convention, the energy delivered to the power grid must be in the form of an Alternating Current (AC) voltage train that oscillates sinusoidally. According to the power grid convention, the AC power train for each pair of power lines must have a specified fixed peak voltage, have a specified fixed frequency, and be synchronized with a specified fixed phase difference between the power lines in the pair of power lines.

A grid-connected single-phase DC/AC converter is a converter that can convert Direct Current (DC) electricity to AC power that conforms to the power grid convention with respect to a specific pair of power lines of the power lines of the grid, and that provides that AC power to the specific pair of power lines. Such a DC/AC converter is referred to as the power grid connection inverter, or is referred to herein as "the single-phase DC/AC converter" herein. The specific pair of power lines that is connected to the single-phase DC/AC converter is referred to as the "power line pair" herein.

A photovoltaic (PV) electric power station converts solar energy to generate DC electrical energy. The generated DC energy is then converted into the AC power train by single-phase DC/AC converters for delivery through the power line pair, and for consumption by the load. This AC power train is in the form of a sinusoidal voltage train oscillating in the time domain; and which conformed to the power grid convention. The PV electric power station is named as the "PV station" herein.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein relate to a device that includes a single-phase inverter that uses a phase adjuster and two DC/AC conversion modules. In accordance with the principles described herein, the single-phase inverter comprises a first DC/AC conversion module to extract and to convert the energy in a DC source to produce a first sinusoidal AC power train that conforms to the power grid convention and is synchronized with a power line pair of the grid. This single-phase inverter further comprises a second DC/AC conversion module to extract and convert at least part of the remaining DC power, referred to as the complemental (or surplus) power herein; to produce a second sinusoidal AC power train that conforms to the power grid convention, except that this second sinusoidal AC power train is 90 degrees out of phase with the power line pair. Notice that these two conversion devices extract their energy without overlapping in time domain (e.g., sequentially). This surplus power would typically be lost as heat.

In accordance at least some embodiments described herein, the single-phase converter further comprises the phase adjuster that adjusts the phase of the second sinusoidal AC voltage train by 90 degrees. The second sinusoidal AC power train then become phase synchronized with the first sinusoidal AC power train, allowing both sinusoidal AC power trains to conformed to the power grid convention, and be synchronized with the power line pair of the power grid. Thus, both AC power trains can be provided on the power line pair. In accordance with some embodiments described herein, the device includes three such single-phase DC/AC converters, one for each power line pair of a three-phase power grid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 2A shows a typical circuit of a Boost DC/DC converter, the single-phase energy extraction/preparation (conditioning) device described herein;

FIG. 2B shows a typical circuit of a Buck DC/DC converter, the single-phase energy extraction/conversion device described herein;

FIGS. 4G and 4H schematically depict the final two synchronized power trains within which one power train is the result of the delaying 405B by the phase adjustment. The delay portion is depicted in FIG. 4I with a dash-line.

DETAILED DESCRIPTION

United States Patent publications US 2016/0036232 and US 2017/0149250 A1 disclose a discovery that conventional single-phase converters can only extract and convert less than half of the Direct Current (DC) power input. These patent publications teach that in order to efficiently extract produced DC electricity for energy utilization, the characteristics of the energy extraction device should be matched to effectively and efficiently extract the produced DC electric energy.

Furthermore, these patent publications teach that the related devices should also be matched to condition and/or deliver the extracted electricity for efficient energy utilization. In lieu of using the Maximum Power Point Tracking (MPPT) device as an optimizer for solar power stations, the reference publications proposed to use a "maximum energy utilization point tracker" as the optimizer for power stations; especially PV power plants. Such an optimizer will be referred to as the "MEUPT optimizer" herein.

In according to the reference patent publications, the MEUPT optimizer is designed to capture what they refer to as "surplus energy" or "surplus power", which they define as the electric energy (or power, respectively) that is produced, but not extracted and/or delivered to the power grid for utilization. That definition of surplus energy (or surplus power) is also used herein. This surplus power has about a 90 degree phase difference from the power grid such that the surplus energy cannot be directly sold to the power grid. The MEUPT optimizer is also designed to temporarily store all the captured surplus energy within an energy reservoir; and then prepare and deliver this electric energy to the power grid for utilization. Thus, the electricity sales revenue of the PV power station can be enhanced when incorporating the MEUPT optimizer.

Several skills in the art can be employed in DC energy extraction, in energy preparation, in energy conditioning, and in energy delivery. The principles described herein may be used regardless of the DC energy source. Nevertheless, this disclosure uses a solar power generation string as an example of the DC energy source to illustrate and clarify the terms energy extraction, preparation, conditioning, and delivery referred to herein. That said, the principles described herein are not limited to extraction, preparation, conditioning, and delivery in the context of solar power. Although they have different physical meaning, the terms "energy" and "power" are interchangeable in the art and interchangeable herein unless indicated otherwise. Also, the terms "AC power train" and "AC voltage train" are interchangeable herein unless indicated otherwise.

Figure 1A:
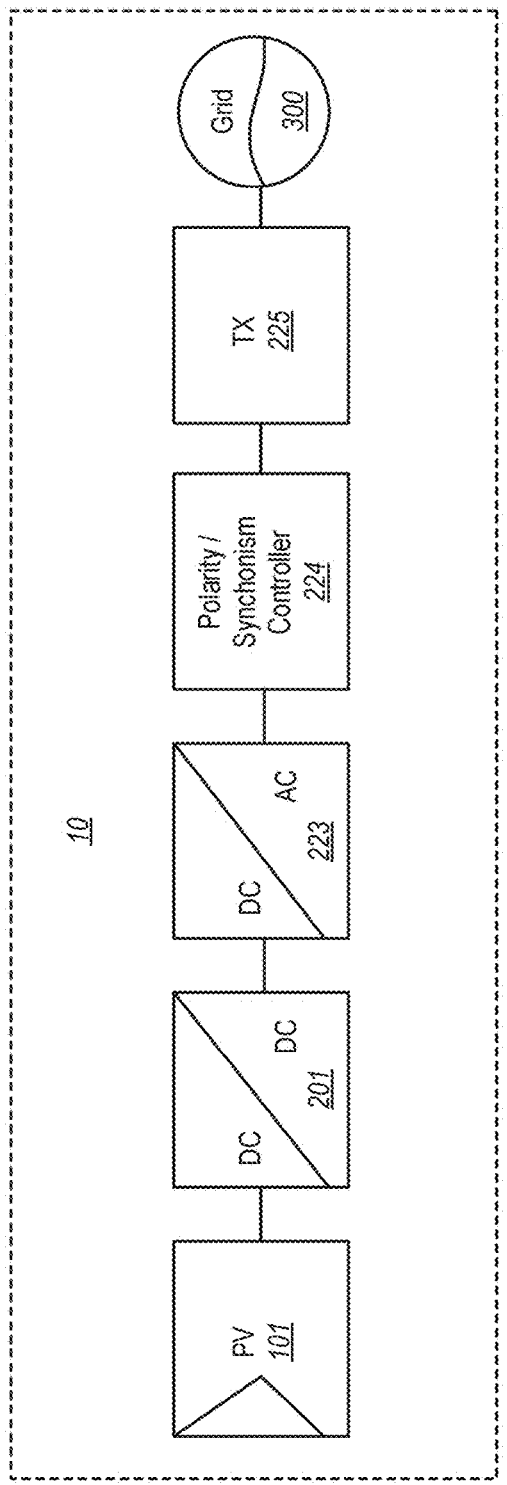
FIG. 1A depicts the modules of a solar power generation sequence to illustrate and clarify the terms energy extraction, preparation, conditioning, DC/AC conversion, and AC power delivery referred to herein.
Figure 1B:
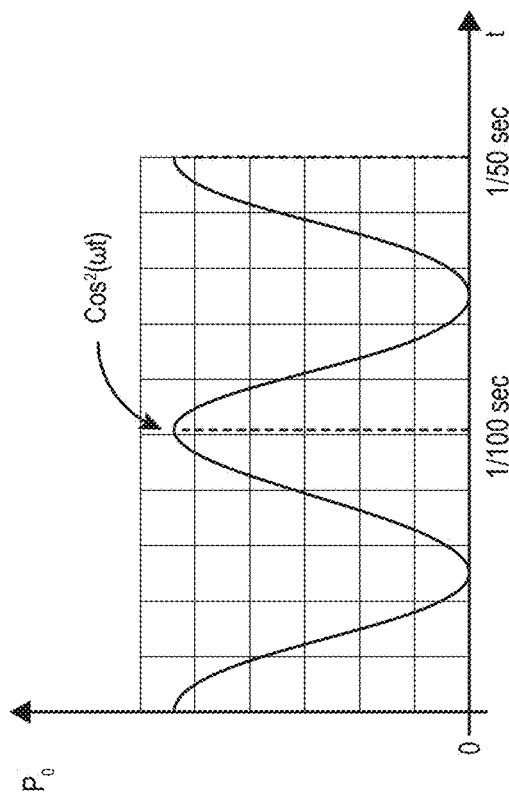
FIG. 1B symbolically shows a sinusoidal time varying (oscillating) AC voltage train representing an AC signal (DC/AC converter output) is sent through a specific power line pair of a power grid system.

FIG. 1A shows the components of a solar power generation sequence 10. The sequence starts at the photo-electric energy conversion device (PV solar strings) 101, which generates electricity energy from photo energy (e.g., solar energy) as the primary energy source. This electrical energy has a time varying voltage that depends on cloud-cover, angle of the sun, efficiency of the PV cells, and many other factors. The electrical energy is then prepared and conditioned by a DC/DC boost converter 201 into a DC energy source with a fixed voltage. When adding a polarity switching controller 224, the DC/AC conversion module 223 converts the prepared fix voltage DC power into a sinusoidal time varying (oscillating) AC voltage train depicted in FIG. 1B.

Figure 2C:
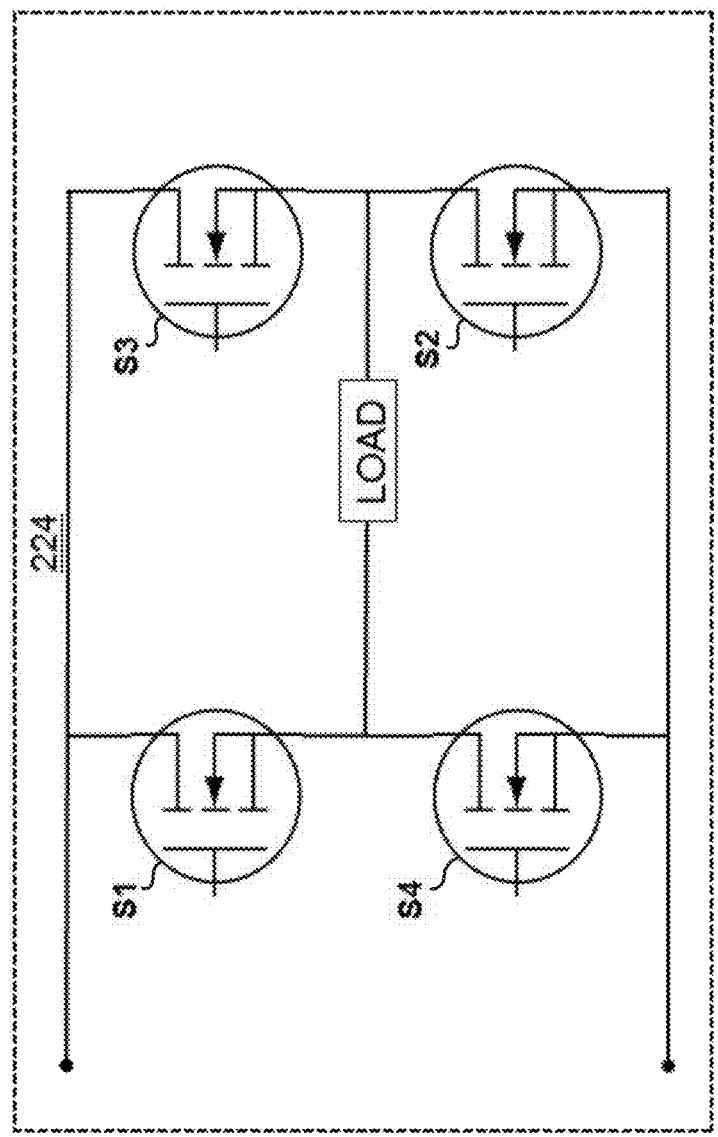
FIG. 2C shows a bridge structure of switches that control the polarity of the DC/DC Buck converter output; thus producing the resulting AC voltage train output as depicted in FIG. 1B.

As an example, the DC/AC conversion module 223 may be a Buck module that is operated by a pulse width modulator (PWM). The Buck module so operated will also be referred to as a DC/AC converter. FIG. 2C illustrates an example of the bridge structure 224. As shown, the bridge structure 224 consists of a set of 4 switches (S1, S2, S3 and S4) that control the synchronism and polarity of the AC output voltage train of this DC/AC converter. Here, the "LOAD" represents the load looking into the transformer 225 from the bridge structure 224. The combination of devices 201 and 223 may be referred to as "the PWM extractor" herein.

The AC voltage power train produced by the bridge structure 224 conforms to the power grid convention. Referring again to FIG. 1A, the AC power train is then feed through a transformer 225 to deliver the power into a grid 300 that is connected to the grid load. FIG. 2A shows an example typical circuit design of a Boost DC/DC converter 201 that can regulate the varying voltage DC energy source to a fixed voltage DC source. FIG. 2B shows an example of typical PWM operated Buck module circuit design of a single-phase DC/AC inverter 223 to convert the fixed voltage DC source into a sinusoidal AC power train. The switch bridge structure 224 (shown in FIG. 2C) controls the polarity and synchronism of the output of this single-phase DC/AC converter 223. The single-phase DC/AC converter 223 (or the PWM extractor when combining the boost DC/DC converter 201 and the single-phase DC/AC converter 223) may also act as an energy extraction/conversion module in the conventional single-phase inversion module of the conventional 3-phase DC/AC converter that is comprised of 3 single-phase inverters.

Section One: Review on Conventional DC/AC Conversion

In general, the voltage at the maximum power production point (MPPPV) in a practical solar string is time varying and less than the specified peak voltage of AC power grid. A voltage-boost energy extractor is needed in PV stations for energy extraction and preparation; which conditions the time varying low voltage DC source into a fix high voltage DC energy source.

FIG. 2A depicts a voltage booster circuit of a DC/DC Boost module 201 which consists of an inductor L; a controllable switch Q regulated by a feedback control duty factor adjuster FCDFA (not shown); a diode D; and a capacitor C. The switch Q is switched at a high frequency (typically about 18 kHz in commercial products) with an adjustable duty factor. The feedback control duty factor adjuster (FCDFA) regulates the adjustable duty factor such that this DC/DC Boost module 201 produces a substantially constant DC output voltage ($v_o$). In other words, this DC/DC Boost module 201 modifies a DC energy source with time varying voltage into an energy source having a fixed DC voltage $v_o$ (typically, $v_o = v_{pk}$, where $v_{pk}$ is the peak voltage of the AC grid) that is suited to the subsequent device in the sequence (namely, the DC/AC conversion module 223 in the case of FIG. 1A). This subsequent DC/AC conversion module converts the DC power with a specified peak voltage into AC power in the form of a sinusoidal power train that conforms to the power grid convention.

During the period in which the switch Q is on, the designed inductor L extracts the energy from the input unit (in the case of FIG. 1A, the PV solar strings 101). Specifically, the inductor L is charged by the input power within the time period specified by a feedback-controlled duty factor of the PWM switch. This charging occurs urging the voltage $v_{sw}$ across switch Q upwards towards the input voltage $v_{in}$ until the voltage $v_{sw}$ across switch reaches a proper value. During the period in which the switch Q is off, current flows from the inductor L through the diode D to charge the designed capacitor C, thus producing a steady-state voltage equal to the desired output voltage (in the grid connecting case, $v=v_0=v_{pk}$). By using feedback control to adjust the duty factor of the on-off period of the switch Q of a properly designed fixed PWM frequency, one can boost up the output voltage from $v_{in}$ to the AC power grid specified peak voltage, $v_0=v_{pk}$. Thus, this voltage-boost circuit can produce a peak voltage suitable to output to the subsequent DC/AC conversion module. The above-described circuit is named as the "Boost DC/DC converter" or "Boost converter" in the art.

As described above, the Boost converter is designed to modify a time varying voltage DC source (e.g. PV strings) to a DC source having a substantially constant voltage which can be equal to the peak voltage value specified for the AC power grid. Note that to prevent the supply peak voltage from decaying in one AC cycle of normal operation, an adequate capacitance is designed for the capacitor C of the Boost circuit depicted in FIG. 2A. That is to say, this capacitor C is for maintaining the voltage to be substantially constant across one AC cycle. A capacitor that performs this described function is often termed as the "DC-link" capacitor in the art. The power grid convention tolerates very little voltage variation across a DC-link. Therefore, a DC-link capacitor is not designed to store large surplus energy as doing so would require an enormous (and thus expensive) capacitor in order to keep within the maximum tolerated voltage variation of the AC power grid.

FIG. 2B depicts a typical DC/AC conversion module 223, which consists of an inductor LL, a controllable switch QQ regulated by a duty factor adjustor DFA, a diode DD, and a DC-link capacitor CC. The switch QQ is switched at a high frequency (typically about 18 kHz in commercial products) with an adjustable duty factor. The switch QQ (which is often referred to as the "PWM switch") is regulated by a pulse width modulator (PWM) signal. The duty factor of this PWM switch is regulated by the duty factor adjuster DFA, so that the produced AC power train of this conversion module 223 conforms to the power grid convention. The depicted DC/AC conversion module 223 is termed the "Buck converter" in the art. The Buck converter 223 associated with the DFA can convert the DC energy source with specified peak voltage into a sinusoidal AC power train. This pulsating AC power train is sent through a switch bridge structure depicts in FIG. 2C (which is an example of the polarity/synchronism controller 224 of FIG. 1A); and then through the transformer (e.g., the transformer 225 of FIG. 1A) into the grid (e.g., the grid 300 of FIG. 1A). As described, the switch bridge structure acts as a polarity and synchronism controller.

As depicted in FIG. 2C, when the switches S1 and S2 are both on, and the switches S3 and S4 are both off, a positive voltage is applied across the load. Conversely, when the switches S3 and S4 are both on, and the switches S1 and S2 are both off, a negative voltage is applied across the load. When this switching is controlled by the synchronize regulator (not shown in FIG. 2C) that senses the positive/negative voltage (or zero voltage crossing) transitions in the power grid, this bridge structure 224 (combined with the duty factor adjustor DFA) can effectively control the output polarity and synchronism of a single-phase DC/AC converter.

The synchronous regulator can timely regulate the time-varying PWM duty factor adjustment; such that a pure sinusoidal power wave form is produced that is represented by $\cos^2(\omega t+\theta)$, with the required AC angular frequency $\omega$, with the required AC peak voltage $v_{pk}$, and with its phase $\theta$ synchronous with the corresponding power line pair of the grid. When incorporated with a fixed voltage DC input and with the parasitic inductance and parasitic capacitance in the grid, the inductor LL and the capacitor CC can be made small or even omitted in practice. In the art, the terms "converter" and "inverter" (and for that matter, "conversion" and "inversion") are interchangeable and thus are interchangeable herein.

Figure 3:
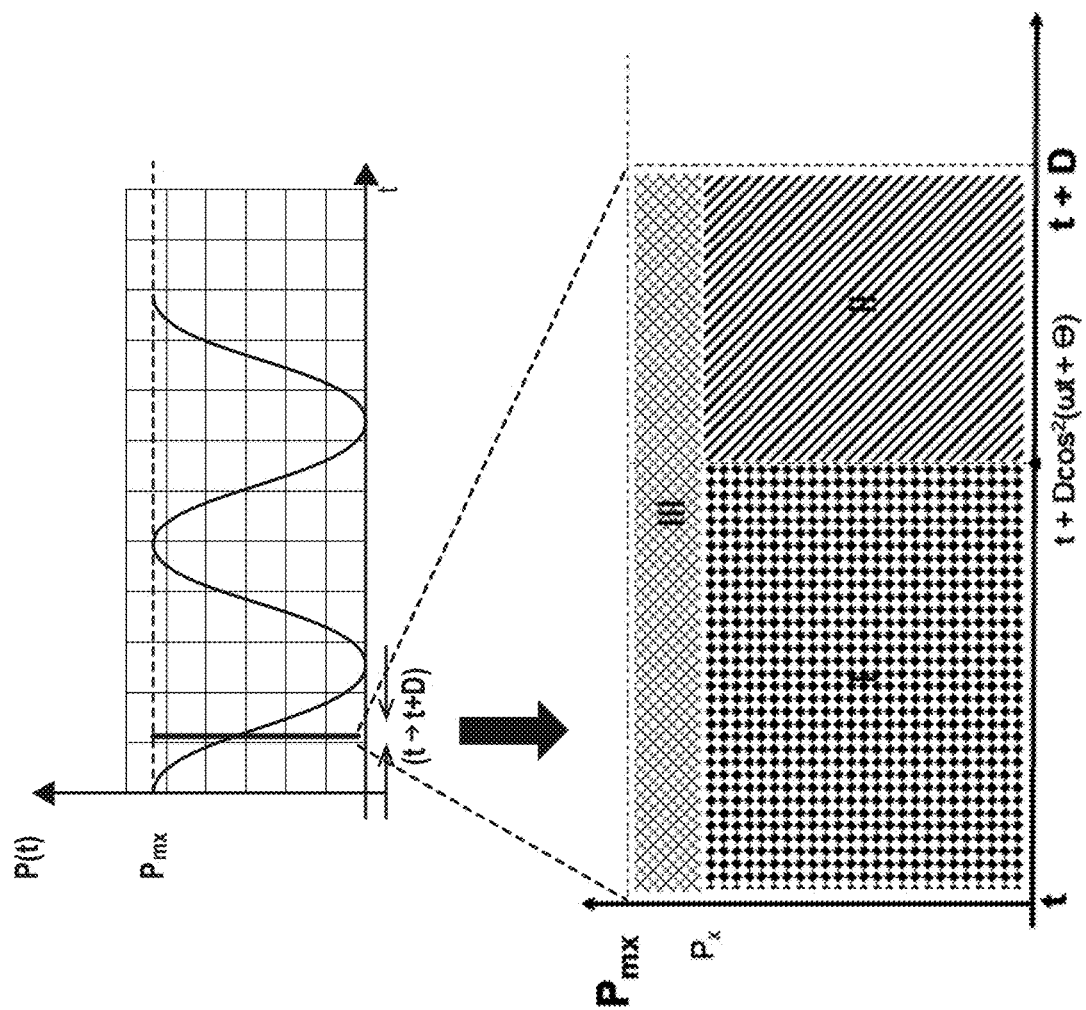
FIG. 3 symbolically depicts the DC energy pulse to be conditioned by the Buck converter in one PWM cycle; which is described as 3 regions: the region-I represents the energy extracted, the region-II and the region-III represent the surplus energy region.

The duty factor adjuster DFA adjusts the duty factor as a function of time in accordance with the design to turn on/off the switch QQ of the Buck converter. Thus, with a properly designed circuit and the prepared peak voltage, this conversion module can produce the desired output voltage value, power form, frequency, and phase that comply with the design requirement including the requirement of the AC power grid convention, and the phase of the corresponding power line of the grid. In the case of a grid-connected unit, the AC synchronous regulator (typically built into the DC/AC converter) is employed to make the prepared AC power output drift along with the power grid in case the peak voltage of the power grid drifts and/or in case the frequency of the power grid drifts. Such a produced AC power signal is depicted in FIG. 3. In other words, using the PWM energy extractor described above, a single-phase DC/AC converter can extract and convert DC electric energy from a fix voltage DC energy source into AC power that conforms to the power grid convention.

Very importantly, note that the output power, P(t) of above single-phase inverter varies in time with a form of $\cos^2(\omega t+\theta)$. Thus, over a specific time period, the energy delivered through the power line of the power grid is equal to the integration of its time varying output power train over this period. The resulting integral value is only equal to a half of the integration of the energy source's constant DC power over the same time period. In other words, the above-described conventional single-phase inverter can only extract and convert at most only half of the energy provided by the DC energy source. The left-over and unused energy is thus more than half of available input energy. This left-over amount contributes to most of the surplus energy described in the above referenced patent publications.

For the purposes of the following analysis, assume that the DC energy source is of constant power $P_{mx}$ in a period of several AC power cycles. FIG. 3 depicts the extracted DC energy pulse in one PWM cycle (having period D). As will be demonstrated, the extracted DC power $P_x$ is less than or equal to the DC power $P_{mx}$. The duty factor d(t)/D at this PWM cycle is adjusted to a value equal to $d(t)/D=\cos^2(\omega t+\theta)$ such that the produced power substantially equals $P_x*\cos^2(\omega t+\theta)$ that conforms to the power grid convention, and where e is the phase of the corresponding power line pair of the grid. FIG. 3 (specifically, the lower half of FIG. 3) also depicts the power-time space (called the energy space) with the time interval D as one PWM period; with the input DC power being $P_{mx}$; and with the extracted power being $P_x$.

As depicted in FIG. 3, this energy space is divided into 3 regions. Region-I represents the extracted DC energy pulse with extracted power $P_x$; and with a time duration of $D*\cos^2(\omega t+\theta)$, which is converted to the single-phase AC power of $P(t)=P_x*\cos^2(\omega t+\theta)$ at an arbitrary time t that corresponds to the PWM extraction time. Region-I is also referred to as the "energy extracted area" or "energy extracted region". The area in between the power $P_{mx}$ of the energy source and the power $P_x$ is the region-III. The region-II is the area after the energy extracted area in the PWM period D. The combined area of the regions-II and III represents a surplus energy area in this energy space. The energy in the surplus energy area (region) is not extracted, not converted into AC power, and is thus not conventionally utilized. Instead, this surplus energy is ultimately absorbed as heat.

To reiterate, the conventional DC/AC single-phase converter employs a voltage boost module to modify a DC power source with time varying voltage into a DC power source with a substantially constant and specific voltage, such as the peak voltage of the grid. This DC source serves as the input DC source for a PWM extractor to extract and convert the DC input energy. When the duty factor in one PWM cycle is regulated by $\cos^2(\omega t+\theta)$ at time t (where the phase θ is the phase of the corresponding power line of the power grid), the output power form conforms to the AC power convention. At a high level, the energy space of each PWM cycle consists of two regions—the extracted energy region (e.g., Region-I in FIG. 3), and the surplus energy region (e.g., the combination of Region-II and Region-III in FIG. 3). The extracted energy is thus converted to AC power and provided to the corresponding power line pair of the power grid; while the surplus energy is turned into heat unless captured and stored in a device such as the MEUPT optimizer.

As described above, the referenced patent publications teach that the amount of surplus energy is at least as large as the extracted energy when integrated through several AC period of time. In other words, a conventional single-phase DC/AC converter can only extract and convert at most half of the input DC energy. In other words, when using the conventional single-phase DC/AC converter, at least half of the input DC energy will become surplus energy; which is not extracted, which is not converted, which is not delivered to the power grid, which not utilized by the load, and which will ultimately turn into heat.

Section Two: The Principles of the Single-Phase EUT Inverter

Although not recognized by those of ordinary skill in the art, there are actually two ways to mitigate the above-described undesirable consequence for a single-phase inverter. The first way is to follow the principles described in the reference patent publications to incorporate the MEUPT optimizer into the energy system. The other way is to follow the principles described herein, which proposes to design a single-phase inverter comprised of a set of two DC/AC conversion modules and a phase adjuster, and sequentially extract energy alternating between the two DC/AC conversion modules where the alternation is caused by the phase adjuster. This new single-phase inverter is referred to as the single-phase energy utilization tracking inverter, or the single-phase EUT inverter.

The first DC/AC conversion module of the single-phase EUT inverter produces a first AC power train by extracting and converting the first energy region (e.g., Region I in FIG. 3) in the energy space of each PWM cycle. Conversely, the second DC/AC conversion module of the single-phase EUT inverter produces a second AC power train by extracting and converting the energy region after the Region-I (e.g., Region-II in FIG. 3). Thus, at time t, the first AC power is $P(t)=P_x*\cos^2(\omega t+\theta)$; while the second AC power is $P'(t)=P_x-P_x*\cos^2(\omega t+\theta)=P_x*(1-\cos^2(\omega t+\theta))=P_x*\sin^2(\omega t+\theta))$. These two output AC power trains have the same peak power, but are the same frequency, but are 90 degrees out of phase with each other. That means when the first AC power train conforms to the power grid convention and the phase of the corresponding power line pair, the second AC power train will be 90 degrees out of phase with the corresponding power line pair of the grid. In other words, the first AC power train can be delivered and provide electric energy to the corresponding power line pair of the power grid; while the second AC power train is not suitable for delivering and providing power to the same power line pair.

In accordance with the principle described herein, the proposed single-phase EUT inverter further comprises a phase adjuster. This phase adjuster can adjust the phase of the above-stated second AC power train by 90 degrees. Thus, the second AC power train is transformed to synchronize with the corresponding power line pair of the grid. As described, both of the outputs of the single-phase EUT inverter (the first and second AC power trains) can then conform to the power grid convention of the same power line pair. Therefore, the two single-phase AC power trains can be delivered into the same power line pair of the grid for subsequent consumption by the connecting loads.

Figure 4A:
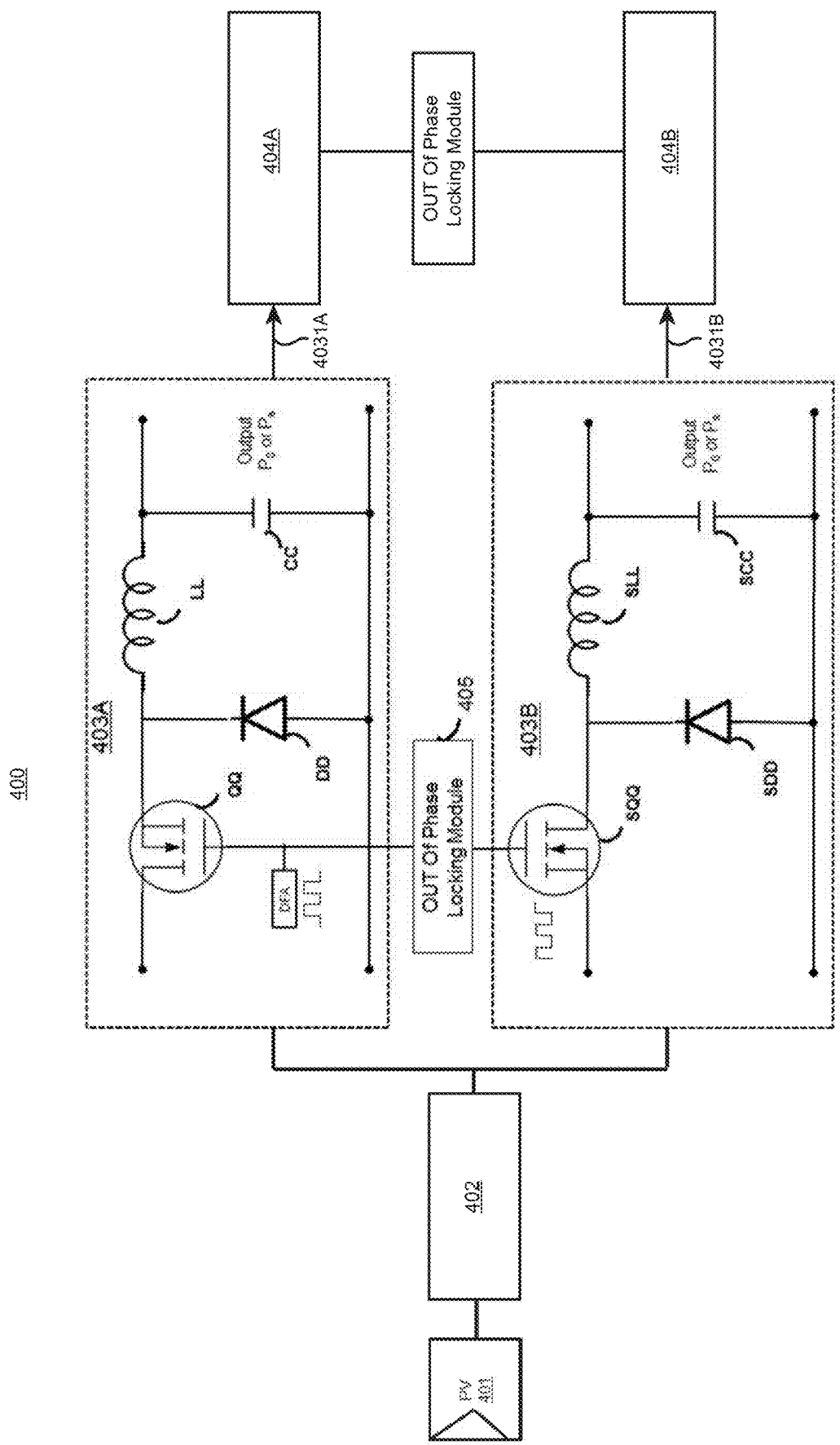
FIG. 4A depicts the modules of a solar power and the input/output sequences for the single-phase EUT inverter sequences in accordance with the principles described herein.

FIG. 4A schematically depicts a block diagram showing the energy generation and input to the single-phase EUT inverter 400. The input energy (characterized as having time varying voltage) is generated by the PV solar string 401. The input energy goes through a boost module 402 that performs energy conditioning to produce a DC energy source with fixed voltage. The boost module 402 may be structured as described above for the Boost module 201 of FIG. 2A.

The fixed voltage DC energy from the Boost module 402 is partially extracted by the first PWM operated DC/AC Buck module 403A to produce the first AC power train 4031A (see FIG. 4B), $P(t)=P_x*\cos^2(\omega t+\theta)$, which conforms to the power grid convention, and has the same phase θ as the corresponding power line of the power grid. Referencing FIG. 2B, recall that this is accomplished by having the duty factor adjuster DFA control the switch QQ so as to have a duty factor $d1(t)/D=\cos^2(\omega t+\theta)$. The first PWN operated DC/AC Buck module 403A may be structured the same as the DC/AC Buck module 223 described above with respect to FIG. 2B, except that the DFA is also coupled to an out of phase locking module 405.

The fixed voltage DC energy from the Boost module is also partially extracted by a second PWM operated DC/AC Buck module 403B. The second DC/AC Buck module 403B may be structured the same as the first DC/AC Buck module 403A, and includes switch SQQ, diode SDD, inductor SLL, and capacitor SCC that connect with each other similar to how the switch QQ, diode DD, inductor LL, and capacitor CC of the first DC/AC Buck module 403A connect to each other. Furthermore, the switch SQQ, diode SDD, inductor SLL, and capacitor SCC of the second DC/AC Buck module 403B may have the same respective sizes as the switch QQ, diode DD, inductor LL, and capacitor CC of the first DC/AC Buck module 403A.

Figure 4B:
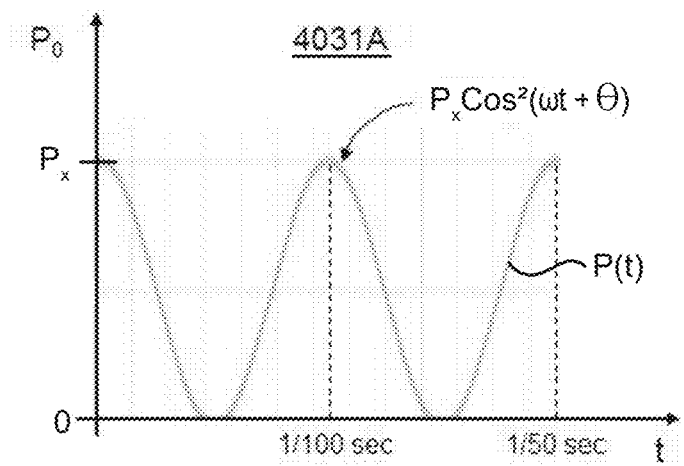
FIGS. 4B and 4C schematically depict the output of the two DC/AC conversion modules, the two 90 degree out of phase pulsating sinusoidal AC power trains that are separately sent into the two polarity controller, the out of phase locking switch bridges.
Figure 4C:
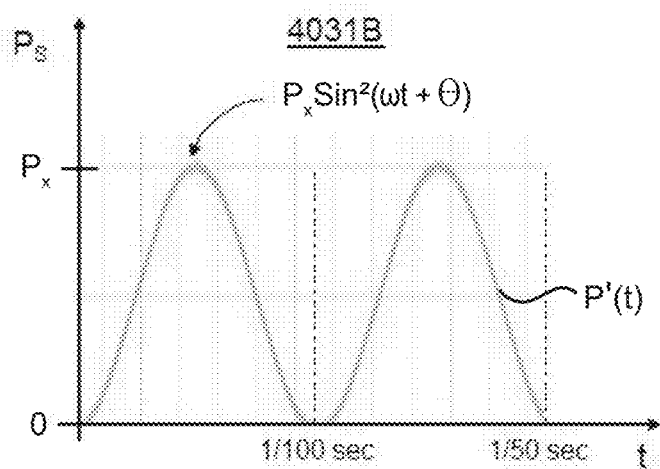
Figure 4D:
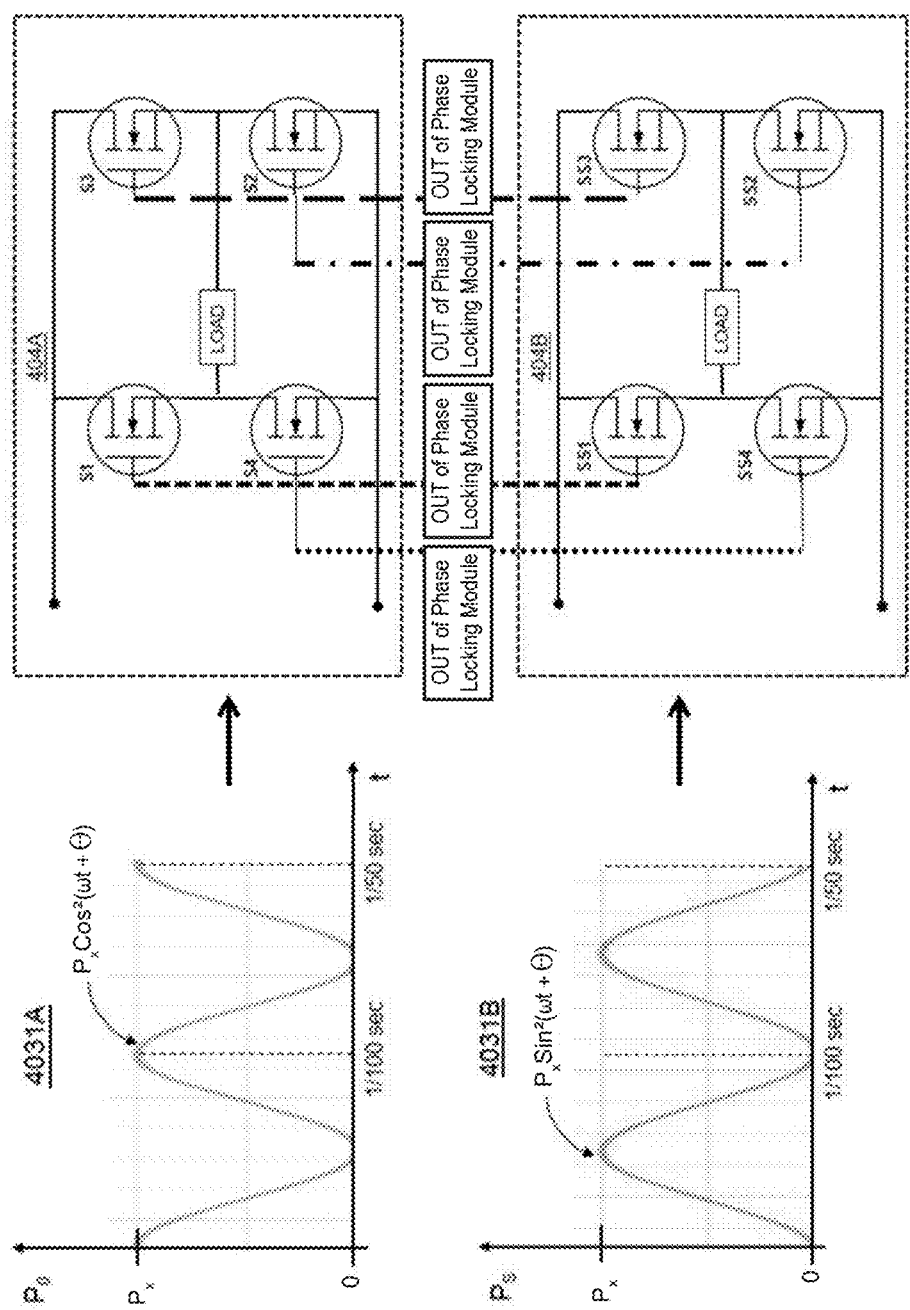
FIG. 4D schematically depicts the two power trains being provided to a respective out of phase bridge structure.

However, the switch SQQ of the second DC/AC Buck module 403B is coupled to the duty factor adjuster DFA via an out of phase locking module 405. The out of phase locking module 405 ensures that when the switch QQ of the first DC/AC Buck module is on, the switch SQQ of the second DC/AC buck module is off, and vice versa. Thus, the duty cycle of the switch SQQ would be $1-d1(t)=1-\cos^2(\omega t+$ $\theta$)=$\sin^2(\omega t+\theta)$. Thus, the second AC power train 4031B (see FIG. 4C) produced by the second DC/AC Buck module 403B has time-varying power train P'(t)=$P_x^*\sin^2(\omega t)$. As described further below, the phase of this second AC power train is further adjusted by a phase adjuster such that the phase of the second AC power train The power train 4031B of FIG. 4B is subsequently adjusted by 90 degrees into an AC power train, P"(t)= $P_x^*\sin^2(\omega t+\theta+90°)$. After the phase adjustment, both AC power trains P(t) and P"(t) become synchronized since the first AC power train 4031A power train (which is P(t)= $P_x^*\cos^2(\omega t)+\theta$), and the second AC power train 4031B (which with the adjustment becomes P"(t)=$P_x^*\sin^2(\omega t+\theta+90°)$=$P_x^*\cos^2(\omega t)+\theta$) become synchronized and suitable to provide into the same power line pair of the grid. For now, suffice it to say that the first power train P(t) (i.e., signal 4031A of FIG. 4B) is provided to a locking bridge switch structures 404A, and the second power train P'(t) (i.e., single 4031B of FIG. 4C) is provided to a second locking bridge structure 404B that is out of phase with the first locking bridge structure 404A. The operation and structure of the out of phase locking bridge structures 404A and 404B are described further below with respect to FIGS. 4D through 4H.

Section Three: The Principles Apply to the 3-Phase EUT Inverter

The root cause of inefficient energy extraction of the conventional single-phase DC/AC converters is also present in the conventional 3-phase DC/AC converters. In essence, a conventional 3-phase DC/AC converter operates three single-phase DC/AC converters that perform extraction and conversion, and deliver similar time-averaged AC power to three pairs of power lines; with 120 degree phase differences. The surplus energy that arises in the single-phase DC/AC converter thus also arises in each of the three single-phase DC/AC converters of the conventional 3-phase DC/AC converter. The bad news is that any root cause of inefficiency in energy extraction of the single-phase DC/AC converters persists three times over in the conventional 3-phase DC/AC converters. The good news is that any effective remedy applicable to the shortcoming of energy extraction of the single-phase inverter can also be an effective remedy applicable three times over to the shortcoming of energy extraction of the 3-phase inverter.

When a 3-phase DC/AC inverter is comprised of three sets of the above described single-phase EUT inverters, the 3-phase DC/AC inverter is referred to as the 3-phase EUT inverter. Each of the single-phase EUT inverters of the 3-phase EUT inverter can extract and convert one third (⅓) of the DC power provided by the DC energy source (e.g., a PV string or station) into two single-phase AC power trains and deliver them to the same power line pair of the 3-phase power grid. For instance, the first single-phase EUT inverter would extract one third of the DC power provided by the DC energy source into a first set of two synchronized single-phase AC power trains and deliver that first set of synchronized single-phase AC power trains to a first corresponding power line pair of the grid. The second single-phase EUT inverter would extract another one third of the DC power provided by the DC energy source into a second set of two synchronized single-phase AC power trains (which are 120 degrees out of phase with the first set of synchronized single-phase AC power trains, but which are synchronized with a second power line pair of the grid) and deliver that second set of synchronized single-phase AC power trains to the second corresponding power line pair of the grid. The third single-phase EUT inverter would extract yet another one third of the DC power provided by the DC energy source into a third set of two synchronized single-phase AC power trains (which are 120 degrees out of phase with the first and second synchronized single-phase AC power trains, but which are synchronized with a third power line pair of the grid) and deliver that third set of synchronized single-phase AC power trains to the third corresponding power line pair of the grid.

Therefore, the combined effort of the three single-phase EUT inverters in the 3-phase EUT inverter can extract and deliver almost all the entire input DC power provided by the energy source into the three pairs of power lines of the 3-phase power grid. Thus, in accordance with the principles described herein, when using the 3-phase EUT inverter to replace the conventional 3-phase DC/AC inverter, we can extract double the amount of energy extracted from the DC energy source; for delivery of the output AC power into the 3-phase power grid for consumption.

Section Four: Examples of the Phase Adjuster

Several skills in the art can be employed to design a phase adjuster referred herein. For instance, as is well-known in the art, a single-phase transformer can delay a single-phase AC voltage train by half an AC cycle associating with a polarity inversion. That means a single-phase transformer can shift the phase of an AC power train by 90 degrees without changing the wave form or the frequency. An ideal transformer (with a primary and secondary turn ratio equal to one) can further preserve the peak voltage of the input AC power train. A real transformer with a turn ratio of one may introduce a slight peak voltage drop. However, this induced drop in peak voltage can be corrected by adjusting the secondary to primary turn ratio to a suitable value. Therefore, a single-phase transformer can be a very practical phase adjuster for the principles described herein. Every single-phase EUT inverter can employ one proper single-phase transformer as its phase adjuster. A 3-phase EUT inverter can employ 3 single-phase EUT inverters, each with such phase adjusters. That said, phase adjustment may also be accomplished via the use of an inductor or a capacitor.

Furthermore, a 3-phase transformer can shift each of the phases in the 3-phase of AC power trains by 90 degrees without changing the wave form or the frequency. Therefore, as described above, a 3-phase EUT inverter could also employ only one 3-phase transformer as a combined phase adjuster to adjust all the three out of phase AC voltage trains to synchronize with 3-pair of power lines in the 3-phase power grid. By replacing the three adjusters in a 3-phase EUT inverter with only one combined adjuster; this candidate phase adjuster can further reduce the cost of the 3-phase EUT inverter.

Section Five: Summaries

As analyzed in Section One, a conventional AC single-phase extractor employs a PWM extractor to extract the DC input power. When the duty factor in one PWM cycle is regulated by $\cos^2(\omega t+\theta)$ in time t, the output power conforms to the AC power convention presuming a proper synchronized phase $\theta$. Note that the energy space of each PWM cycle consists of two regions; one is the extracted energy region while the other is the surplus energy region. The referenced patent publications teach that the amount of surplus energy is at least as large as the extracted energy when integrated through several AC periods of time. In other words, a single-phase DC/AC converter can only extract and convert at most half of the input DC power. The extracted energy is converted to AC power and provided to the power grid; while the surplus energy is turned into heat unless captured and stored in a device such as the MEUPT device.

As described in Section Two, the proposed new single-phase DC/AC converter designs comprise a set of two DC/AC conversion modules and a phase adjuster, and using the same to practice sequential energy extraction. The new single-phase DC/AC converters are also termed herein as the "single-phase EUT inverters". The first DC/AC conversion module of the single-phase EUT inverter produces a first AC power train from extracting and converting the first energy region (e.g., Region I in FIG. 3) in the energy space of each PWM cycle; while the second DC/AC conversion module produces a second AC power train from extracting and converting the energy region after that (e.g., Region II in FIG. 3). Thus, at time t, the first AC power is $P(t)=P_x*\cos^2(\omega t+\theta)$; while the second AC power is $P'(t)=P_x*\sin^2(\omega t+\theta)$. These two output AC power trains have same peak power, same frequency, but are 90 degrees out of phase to each other (compare FIGS. 4B and 4C). That means when the first AC power train conforms to the power grid convention and is the synchronized with the corresponding power line pair of the power grid, but the second AC power train is 90 degrees out of phase with that same power line pair of the grid. In other words, the first AC power train can be delivered and provide electric energy to the corresponding power line pair of the power grid; while the second AC power train is not suitable for delivering and providing power to the same power line pair.

The single-phase EUT inverter further comprises a phase adjuster. This phase adjuster can adjust the phase of the above-stated second AC power train by 90 degrees. Thus, the second AC power train is transformed to synchronize with the corresponding power line pair of the grid. As described, both of the outputs of the single-phase EUT inverter (the first and second AC power trains) can then conform to the power grid convention of the same power line pair. Therefore, the output of the single-phase EUT inverter, the two single-phase AC power trains can be delivered into the same power line pair of the grid and consumed by the connecting loads.

As described in Section Three, when a 3-phase DC/AC inverter comprised of a set of 3 of the above described single-phase EUT inverters, the 3-phase DC/AC inverter is referred to as the 3-phase EUT inverter. Each of the single-phase EUT inverters of the 3-phase EUT inverter can extract and convert one third of the DC power provided by the DC energy source (e.g., a PV string or station) into two single-phase AC power trains and deliver them to the same power line pair of the 3-phase power grid. Therefore, the combined effort of the three single-phase EUT inverters in the 3-phase EUT inverter can extract and deliver the entire input DC power provided by the energy source into three pairs of power lines of the 3-phase power grid. Thus, in accordance with the principles described herein, when using the 3-phase EUT inverter to replace the conventional 3-phase DC/AC inverter, one can extract double the amount of power from the DC energy source; and deliver the output AC power into the 3-phase power grid for consumption. As described, the remedy of the conventional single-phase inverter is also the remedy of the conventional 3-phase inverter.

The Section Four described a practical device that can perform the required 90 degree phase adjustment for the second AC power train and maintain all other specifications to conform to the power grid convention. Furthermore, this candidate is also suitable for the 3-phase EUT inverters.

To illustrate and clarify the related terms used in the principle described herein, FIG. 4A depicts the modules of a solar power input and the output sequences for the single-phase EUT inverter 400. This input sequence starts with the energy generated in the solar strings 401 as an energy source with varying voltage, which serves as the input source to the voltage boost module 402. The output of the energy source is stored into a capacitor C and is almost constant voltage DC source.

In other words, this voltage boost module 402 modifies the varying voltage DC energy source into a fixed voltage DC energy source stored into the DC-link capacitor C (see capacitor C of FIG. 2A). This fixed voltage DC energy source is then serviced as an input to the two sets of DC/AC conversion modules 403A and 403B. These two conversion modules are operated by out of phase locking PWM switches QQ and SQQ causing a sequentially energy extraction from the DC-link capacitor C. The DC/AC conversion modules thus each generate a respective pulsating sinusoidal power train 4031A and 4031B (also shown in FIGS. 4B and 4C) which are 90 degrees out of phase with each other. As shown in Figure D, these two 90 degree out of phase pulsating power trains 4031A (P'(t)) and 4031B (P'(t)) are each then sent into a respective out of phase locking bridge switch structures 404A and 404B (as also shown as FIG. 4D). Each of the locking bridge structures 404A and 404B may be structured as described for the bridge structure 224 of FIG. 2C, except that the switches S1 of the SS1 are controlled out of phase, switches S2 and S22 are controlled to be out of phase, switches S3 and S33 are controlled to be out of phase, and the switches S4 and S44 are controlled to be out of phase.

Figure 4E:
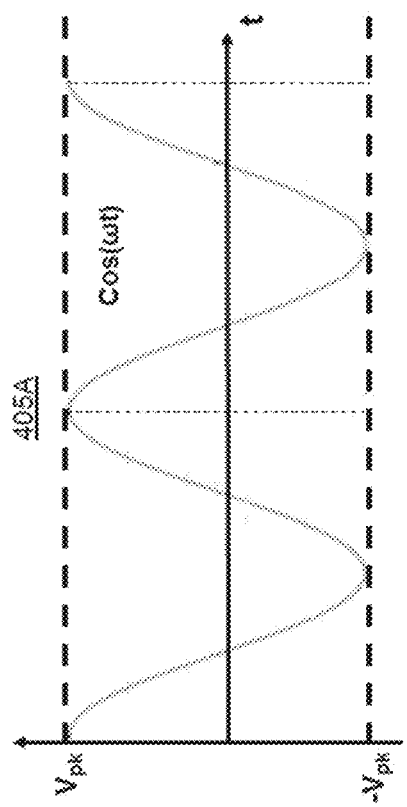
FIGS. 4E and 4F schematically depict the two outputs of the out of phase bridge structures.
Figure 4F:
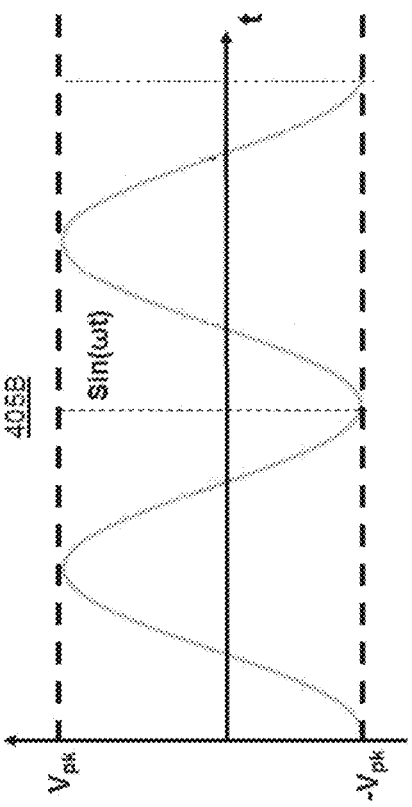
Figure 4F:
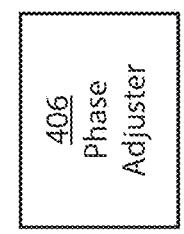

These bridge structures control the polarity of inputs 4031A and 4031B; and producing two AC voltage trains with a 90 degree phase difference, depicted as 405A and 405B of FIGS. 4E and 4F, respectively. As shown in FIG. 4F, the second AC voltage train 405B may be provided into a 90 degree phase adjuster 406, resulting in the second AC voltage train 405B becoming phase-synchronized with the first AC voltage train 405A. Thus, both AC voltage trains are suitable for delivering (via the transformer) to the same power line pair of a grid. For completeness, FIGS. 4G and 4H also depict the final two synchronized power trains within which one power train is the resulting signal 407B of the delaying by the phase adjustment 406. The delay portion is depicted in FIG. 4H with a dash-line. The other resulting power signal 407A is not delayed.

The present invention may be embodied in other specific forms without departing from its spirit or essential characteristics. The described embodiments are to be considered in all respects only as illustrative and not restrictive. The scope of the invention is, therefore, indicated by appended claims rather than by the forgoing description. All changes which come within the meaning and range of equivalency of the claims are to be embraced within their scope.

What is claimed is:

1. A device comprising:
 a single-phase DC/AC converter comprising:
  a first DC/AC conversion module that is operated by a pulse width modulator so as to perform a first energy extraction from a DC energy source of substantially fixed voltage, the first DC/AC conversion module configured to perform the first energy extraction within a first portion of a duty cycle of a pulse width modulator signal of the pulse width modulator to produce a first sinusoidal AC power train;
  a second DC/AC conversion module that is operated by the pulse width modulator so as to perform a second energy extraction from the DC energy source, the second DC/AC conversion module configured to perform the second energy extraction within a second portion of a duty cycle of the pulse width modulator signal of the pulse width modulator to produce a second sinusoidal AC power train that is 90 degrees out of phase from the first sinusoidal AC power train, the second portion of the duty cycle not overlapping with the first portion of the duty cycle; and a phase adjuster configured to adjust one of the first or second sinusoidal AC power trains by a 90 degree phase-shift such that both the first and second sinusoidal AC power trains have a same phase.

2. The device in accordance with claim 1, the second portion of the duty cycle being adjacent to the first portion of the duty cycle, so that the first energy extraction and the second energy extraction are sequential.

3. The device in accordance with claim 1 the single-phase DC/AC converter being coupled to a power line pair of a power grid, the phase of the first and second sinusoidal AC power trains being synchronized with the power line pair of the power grid.

4. The device in accordance with claim 1 the phase adjuster comprising a single-phase transformer.

5. The device in accordance with claim 1 the phase adjuster comprising an inductor.

6. The device in accordance with claim 1 the phase adjuster comprising a capacitor.

7. The device in accordance with claim 1 comprising: a three-phrase DC/AC conversion module that includes the single-phase DC/AC conversion module as a first DC/AC conversion module with the phase adjustor being a first phase adjustor, the pulse width modulator being a first pulse width modulator, and the phase of the first and second sinusoidal AC power trains of the first DC/AC conversion module being synchronized with a first power line pair of a power grid.

8. The device in accordance with claim 7, the three-phase DC/AC conversion module further comprising:

a third DC/AC conversion module that is operated by a second pulse width modulator so as to perform a third energy extraction from the DC energy source, the third DC/AC conversion module configured to perform the third energy extraction within a first portion of a duty cycle of a pulse width modulator signal of the second pulse width modulator to produce a third sinusoidal AC power train;

a fourth DC/AC conversion module that is operated by the second pulse width modulator so as to perform a fourth energy extraction from the DC energy source, the fourth DC/AC conversion module configured to perform the fourth energy extraction within a second portion of a duty cycle of the pulse width modulator signal of the second pulse width modulator to produce a fourth sinusoidal AC power train, the second portion of the duty cycle of the pulse width modulator signal of the second pulse width modulator not overlapping with the first portion of the duty cycle of the pulse width modulator signal of the second pulse width modulator; and a second phase adjuster configured to adjust one of the third or fourth sinusoidal AC power trains by a 90 degree phase-shift such that both the third and fourth sinusoidal AC power trains have a phase that is synchronized with a second power line pair of the power grid.

9. The device in accordance with claim 8, the first phase adjuster comprising a first single-phase transformer, the second phase adjuster comprising a second single-phase transformer.

10. The device in accordance with claim 8, the three-phase DC/AC conversion module further comprising:

a fifth DC/AC conversion module that is operated by a third pulse width modulator so as to perform a fifth energy extraction from the DC energy source, the fifth DC/AC conversion module configured to perform the fifth energy extraction within a first portion of a duty cycle of a pulse width modulator signal of the third pulse width modulator to produce a fifth sinusoidal AC power train;

a sixth DC/AC conversion module that is operated by the third pulse width modulator so as to perform a sixth energy extraction from the DC energy source, the sixth DC/AC conversion module configured to perform the sixth energy extraction within a second portion of a duty cycle of the pulse width modulator signal of the third pulse width modulator to produce a sixth sinusoidal AC power train, the second portion of the duty cycle of the pulse width modulator signal of the third pulse width modulator not overlapping with the first portion of the duty cycle of the pulse width modulator signal of the third pulse width modulator; and a third phase adjuster configured to adjust one of the fifth or sixth sinusoidal AC power trains by a 90 degree phase-shift such that both the fifth and sixth sinusoidal AC power trains have a phase that is synchronized with a third power line pair of the power grid.

11. The device in accordance with claim 10, the first phase adjuster comprising a first single-phase transformer, the second phase adjuster comprising a second single-phase transformer, and the third phase adjuster comprising a third single-phase transformer.

12. The device in accordance with claim 10, wherein a three-phase transformer comprises the first phase adjuster, the second phase adjuster, and the third phase adjuster.

13. A device comprising a three-phase DC/AC conversion module comprising a first single-phase DC/AC converter and a second single-phase DC/AC converter, the first single-phase DC/AC converter comprising:

a first DC/AC conversion module that is operated by a first pulse width modulator so as to perform a first energy extraction from a DC energy source of substantially fixed voltage, the first DC/AC conversion module configured to perform the first energy extraction within a first portion of a duty cycle of a pulse width modulator signal of the first pulse width modulator to produce a first sinusoidal AC power train;

a second DC/AC conversion module that is operated by the first pulse width modulator so as to perform a second energy extraction from the DC energy source, the second DC/AC conversion module configured to perform the second energy extraction within a second portion of a duty cycle of the pulse width modulator signal of the first pulse width modulator to produce a second sinusoidal AC power train, the second portion of the duty cycle of the pulse width modulator signal of the first pulse width modulator not overlapping with the first portion of the duty cycle of the pulse width modulator signal of the first pulse width modulator; and a first phase adjuster configured to adjust one of the first or second sinusoidal AC power trains by a 90 degree phase-shift such that both the first and second sinusoidal AC power trains have a same phase that is synchronized with a first power line pair of a power grid; and the second single-phase DC/AC converter comprising:
- a third DC/AC conversion module that is operated by a second pulse width modulator so as to perform a third energy extraction from the DC energy source, the third DC/AC conversion module configured to perform the third energy extraction within a first portion of a duty cycle of a pulse width modulator signal of the second pulse width modulator to produce a third sinusoidal AC power train;
- a fourth DC/AC conversion module that is operated by the second pulse width modulator so as to perform a fourth energy extraction from the DC energy source, the fourth DC/AC conversion module configured to perform the fourth energy extraction within a second portion of a duty cycle of the pulse width modulator signal of the second pulse width modulator to produce a fourth sinusoidal AC power train, the second portion of the duty cycle of the pulse width modulator signal of the second pulse width modulator not overlapping with the first portion of the duty cycle of the pulse width modulator signal of the second pulse width modulator; and
- a second phase adjuster configured to adjust one of the third or fourth sinusoidal AC power trains by a 90 degree phase-shift such that both the third and fourth sinusoidal AC power trains have a phase that is synchronized with a second power line pair of the power grid.

14. The device in accordance with claim 13, the first phase adjuster comprising a first single-phase transformer, the second phase adjuster comprising a second single-phase transformer.

15. The device in accordance with claim 13, the three-phase DC/AC conversion module further comprising a third single-phase DC/AC converter comprising
- a fifth DC/AC conversion module that is operated by a third pulse width modulator so as to perform a fifth energy extraction from the DC energy source, the fifth DC/AC conversion module configured to perform the fifth energy extraction within a first portion of a duty cycle of a pulse width modulator signal of the third pulse width modulator to produce a fifth sinusoidal AC power train;
- a sixth DC/AC conversion module that is operated by the third pulse width modulator so as to perform a sixth energy extraction from the DC energy source, the sixth DC/AC conversion module configured to perform the sixth energy extraction within a second portion of a duty cycle of the pulse width modulator signal of the third pulse width modulator to produce a sixth sinusoidal AC power train, the second portion of the duty cycle of the pulse width modulator signal of the third pulse width modulator not overlapping with the first portion of the duty cycle of the pulse width modulator signal of the third pulse width modulator; and
- a third phase adjuster configured to adjust one of the fifth or sixth sinusoidal AC power trains by a 90 degree phase-shift such that both the fifth and sixth sinusoidal AC power trains have a phase that is synchronized with a third power line pair of the power grid.

16. The device in accordance with claim 15, the first phase adjuster comprising a first single-phase transformer, the second phase adjuster comprising a second single-phase transformer, and the third phase adjuster comprising a third single-phase transformer.

17. The device in accordance with claim 15, wherein a three-phase transformer comprises the first phase adjuster, the second phase adjuster, and the third phase adjuster.

* * * * *